(12) United States Patent
Wu et al.

(10) Patent No.: US 10,019,040 B2
(45) Date of Patent: Jul. 10, 2018

(54) CONVERTIBLE DEVICE HINGE CABLE ROUTING SYSTEM

(71) Applicant: Dell Products L.P., Round Rock, TX (US)

(72) Inventors: Chin-Chung Wu, New Taipei (TW); Chang Chih-Chieh, Taipei (TW); He Chun-Min, Taipei (TW)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 15/470,615

(22) Filed: Mar. 27, 2017

(65) Prior Publication Data

US 2017/0255235 A1    Sep. 7, 2017

Related U.S. Application Data

(63) Continuation of application No. 15/061,104, filed on Mar. 4, 2016, now Pat. No. 9,658,654.

(51) Int. Cl.
*G06F 1/16* (2006.01)

(52) U.S. Cl.
CPC .......... *G06F 1/1683* (2013.01); *G06F 1/1681* (2013.01); *G06F 1/1613* (2013.01)

(58) Field of Classification Search
CPC .............................. G06F 1/1683; G06F 1/1616
See application file for complete search history.

(56) References Cited

U.S. PATENT DOCUMENTS

| | | | |
|---|---|---|---|
| 5,043,846 A | 8/1991 | Kinoshita | |
| 7,667,959 B2 | 2/2010 | Pelkonen | |
| 7,719,827 B2 | 5/2010 | Mihara et al. | |
| 7,848,094 B2 | 12/2010 | Wang et al. | |
| 8,310,844 B2 | 11/2012 | Hashimoto et al. | |
| 8,593,800 B2 | 11/2013 | Asakura et al. | |
| 9,292,049 B1 | 3/2016 | Woodhull et al. | |
| 9,658,654 B1* | 5/2017 | Wu | G06F 1/1683 |
| 2004/0266239 A1 | 12/2004 | Kurokawa | |
| 2005/0122671 A1 | 6/2005 | Homer | |
| 2005/0236869 A1 | 10/2005 | Ka et al. | |
| 2012/0147535 A1* | 6/2012 | Ahn | G06F 1/1641 361/679.01 |

FOREIGN PATENT DOCUMENTS

WO    WO 2010100843 A1 *    9/2010    ........... G06F 1/1618

* cited by examiner

*Primary Examiner* — Anthony Q Edwards
(74) *Attorney, Agent, or Firm* — Haynes and Boone, LLP (57) ABSTRACT

A hinge cable routing system includes a hinge chassis that includes a first hinge wall and a second hinge wall that is spaced apart from the first hinge wall to define a hinge housing between the first hinge wall and the second hinge wall. A first shaft extends through the hinge housing and out of the hinge chassis. A second shaft extends through the hinge housing and out of the hinge chassis. A cable extends through the hinge housing adjacent the first hinge wall and between the first hinge wall and each of the first shaft and the second shaft such that no portion of the cable that extends through the hinge housing is located between the second hinge wall and either of the first shaft and the second shaft.

20 Claims, 10 Drawing Sheets

CONVERTIBLE DEVICE HINGE CABLE ROUTING SYSTEM

CROSS-REFERENCE TO RELATED APPLICATIONS

This is a Continuation application to U.S. utility application Ser. No. 15/061,104 filed Mar. 4, 2016, entitled "CONVERTIBLE DEVICE HINGE CABLE ROUTING SYSTEM,", the disclosure of which is incorporated herein by reference in its entirety.

BACKGROUND

The present disclosure relates generally to information handling systems, and more particularly to routing cabling through a hinge provided with a convertible information handling systems As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some information handling systems such as, for example, convertible laptop/tablet computing devices (also known as "2-in-1" laptop/tablet computing devices), utilize mechanical linkages to allows the computing device to convert between different use orientations. For example, convertible laptop/tablet computing devices typically include one or more hinges that movably couple a display chassis that houses a display device to a base chassis that houses computing components, input devices, and or other computing device subsystems. As such, a display cable that connects the display device to the computing components must be routed through the hinge(s) in order to, for example, allow the computing components to provide information for display on the display device. Conventional convertible laptop/tablet computing devices have been provided that include a pair of hinges (also known as a "split hinge" design) mounted to opposite edges of each of the display chassis and the base chassis. In many situations, the split hinge designs allows the display cable to be routed between the display device and the computing components without any display cable issues. For example, the smaller hinge chassis used to provide the hinges in the split hinge design typically house a hinge mechanism adjacent a first end that is coupled to the base chassis and the display chassis, and include a free volume adjacent a second end that is opposite the first end for routing the display cable without issue.

However, some convertible laptop/tablet computing devices have moved to a "monohinge" design, which provides a single hinge as the only hinge device that couples the display chassis with the base chassis. In such monohinge designs, a hinge chassis houses a hinge mechanism that includes a first shaft that allows rotation of the display chassis relative to the hinge, and a second shaft that allows rotation of the base chassis relative to the hinge, in order to provide the laptop/tablet convertible functionality discussed above. However, such monohinge systems route the display cable through the hinge mechanism such that the display cable extends around each of the shafts in a manner that has been found to require a larger hinge chassis than is necessary (i.e., relative to when that hinge chassis is provided according to the teachings of the present disclosure), while also increasing the chance of damaging the display cable through repeated engagement of the shaft(s) and the display cable.

Accordingly, it would be desirable to provide an improved convertible device hinge cable routing system.

SUMMARY

According to one embodiment, an Information Handling System (IHS) includes a display chassis that houses a display device; a base chassis that houses a processing system; a display cable coupled to each of the display device and the processing system; and a hinge that moveable couples the display chassis to the base chassis, wherein the hinge includes:a hinge chassis that includes a first hinge wall and a second hinge wall that is spaced apart from the first hinge wall to define a hinge housing between the first hinge wall and the second hinge wall; a first shaft that extends through the hinge housing and into engagement with the display chassis, wherein the first shaft is configured to provide relative movement between the display chassis and the hinge; and a second shaft that extends through the hinge housing and into engagement with the base chassis, wherein the second shaft is configured to provide relative movement between the base chassis and the hinge; where the display cable extends through the hinge housing adjacent the first hinge wall and between the first hinge wall and each of the first shaft and the second shaft such that no portion of the display cable that extends through the hinge housing is located between the second hinge wall and either of the first shaft and the second shaft.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
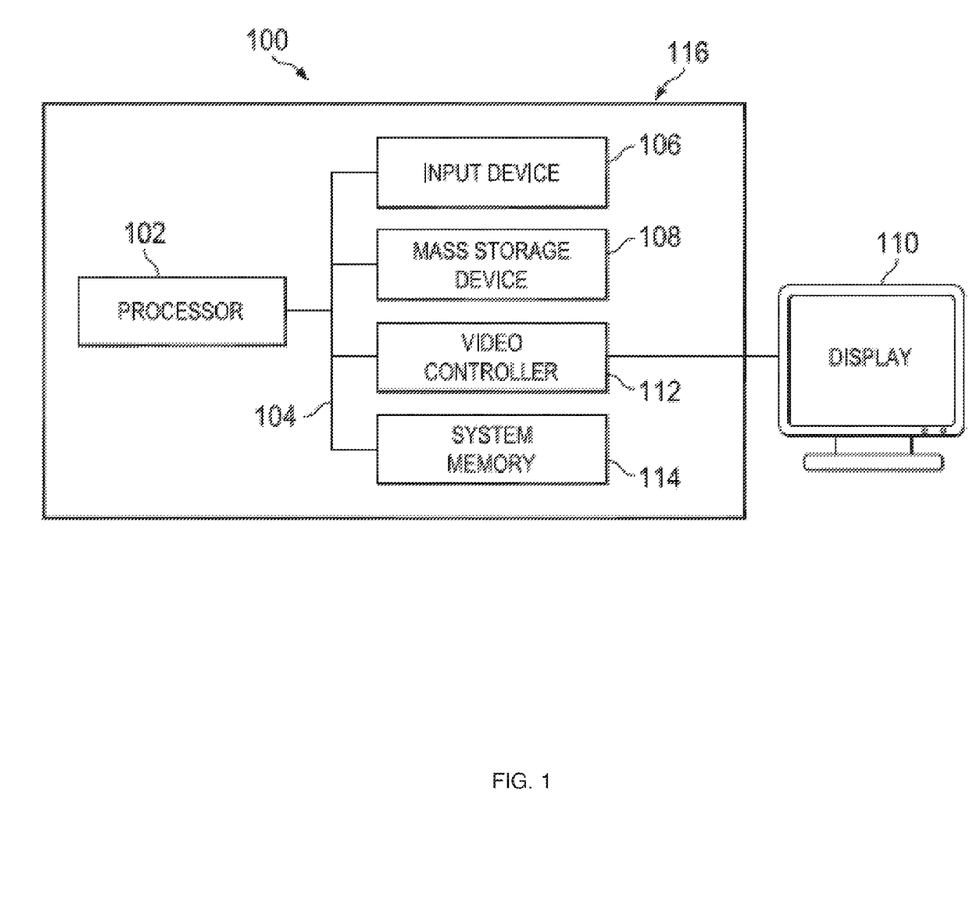
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2A:
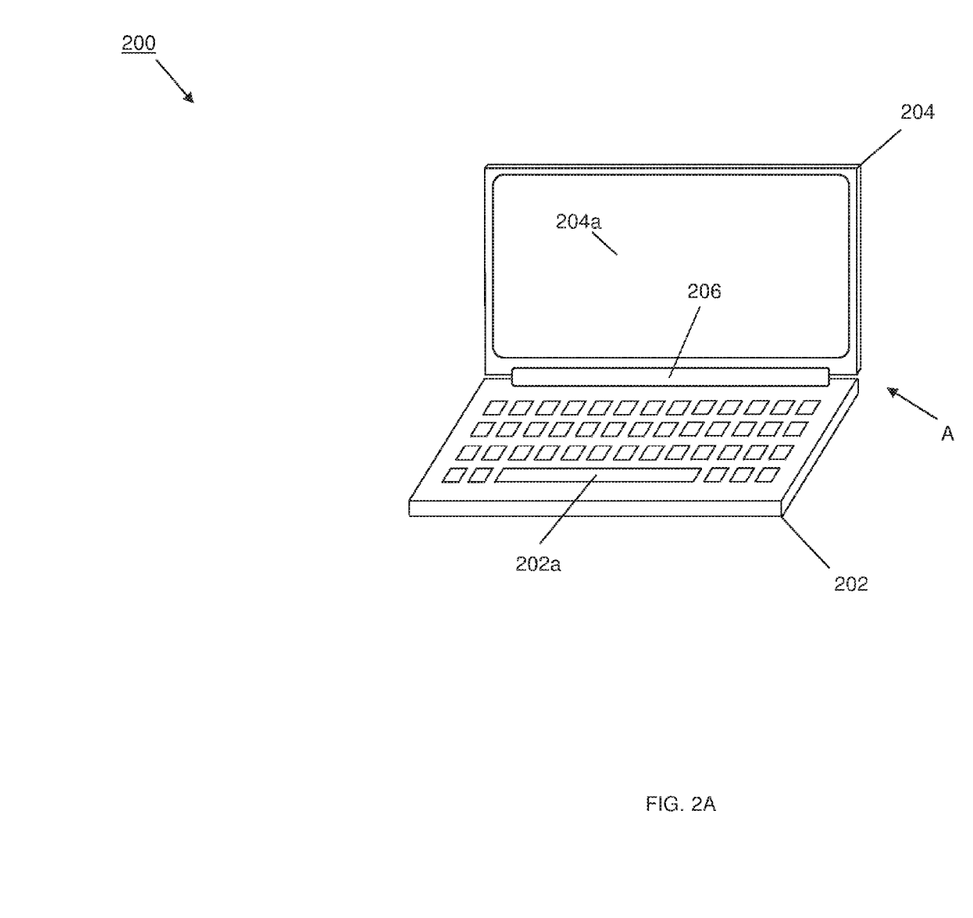
FIG. 2A is a perspective view illustrating an embodiment of a convertible computing device in a laptop/notebook orientation.
Figure 2B:
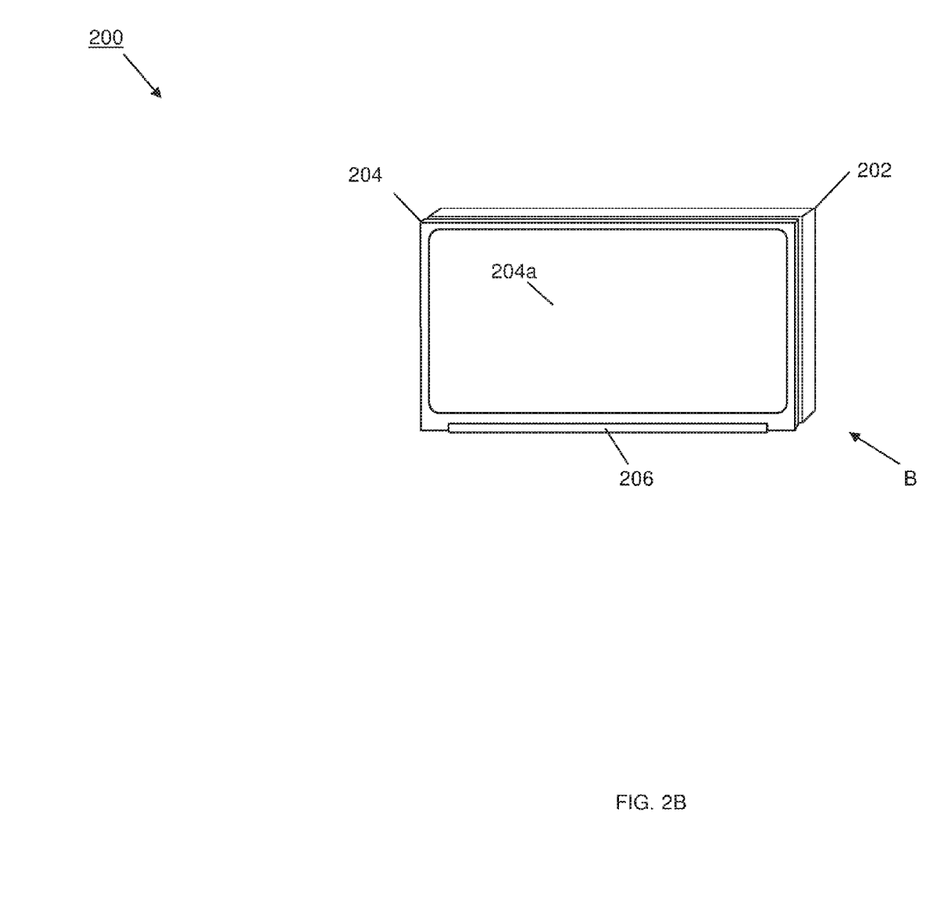
FIG. 2B is a perspective view illustrating an embodiment of the convertible computing device of FIG. 2A in a tablet orientation.

Referring now to FIGS. 2A and 2B, an embodiment of a convertible device hinge cable routing system 200 is illustrated. The convertible device hinge cable routing system 200 is provided in a convertible computing device may be the IHS 100 discussed above with reference to FIG. 1 and/or may include some or all of the components of the IHS 100. One of skill in the art in possession of the present disclosure will recognize that the convertible computing device is illustrated in FIGS. 2A and 2B as a convertible laptop/tablet computing device (also known as "2-in-1" laptop/tablet computing device.) However, the hinge cable routing system of the present disclosure is envisioned as providing benefits to other systems known in the art that route cabling through hinges, and thus those hinge cable routing systems will fall within the scope of the present disclosure as well. The convertible computing device includes a base chassis 202 that is movably coupled to a display chassis 204 by a hinge 206. The base chassis 202 houses input subsystems coupled to input devices 202a that are accessible on a surface of the base chassis 202 (which are illustrated as keys on a keyboard, but which may include touch pads, function buttons, and/or a variety of other input devices known in the art.) While not explicitly illustrated, the base chassis 202 may house a variety of computing device components including processing systems (e.g., including the processor 102 discussed above with reference to FIG. 1), memory systems (e.g., the system memory 114 discussed above with reference to FIG. 1), storage devices (e.g., the storage device 108 discussed above with reference to FIG. 1), circuit boards, buses, and/or a variety of other computing device components known in the art.

The display chassis 204 houses a display device 204a that includes a display screen visible as a surface of the display chassis 204 in FIGS. 2A and 2B. While not explicitly illustrated, the display chassis 202 may house a variety of display subsystem components including, for example, a Liquid Crystal Display (LCD) panel, touch input components, circuit boards, buses, and/or a variety of other computing device components known in the art. In the illustrated embodiment, the hinge 206 that movably couples the base chassis 202 to the display chassis 204 is a single hinge that provides the only hinge that movably couples the base chassis 202 to the display chassis 204 in what may be referred to as a "monohinge" design. However, other hinge designs (e.g., "split hinge" designs) may benefit from the teachings of the present disclosure (e.g., when it is desirable to route cabling through a hinge chassis adjacent a hinge mechanism) and thus are envisioned as falling within its scope. FIG. 2A illustrates how the hinge 206 is configured to allow the display chassis 204 to move relative to the base chassis 202 from a "closed" or "storage" orientation (not illustrated) in which the display surface of the display device 208 is located immediately adjacent the input devices 202a, to a "laptop/notebook" orientation A illustrated in FIG. 2A, and to a "tablet" orientation B illustrated in FIG. 2B. While not illustrated in FIGS. 2A and 2B, as illustrated and discussed in detail below, one or more cables may extend between display subsystem components in the display chassis 204 (e.g., the display device 204a via, for example, a circuit board or bus) and computing system components in the base chassis 202 (e.g., the processing system via, for example, a circuit board or bus), and a portion of that cable may be routed through the hinge 206. While the cable illustrated and discussed below is referred to as a "display cable", other cables are envisioned as benefitting from the teachings of the present disclosure and thus will fall within its scope.

Figure 3A:
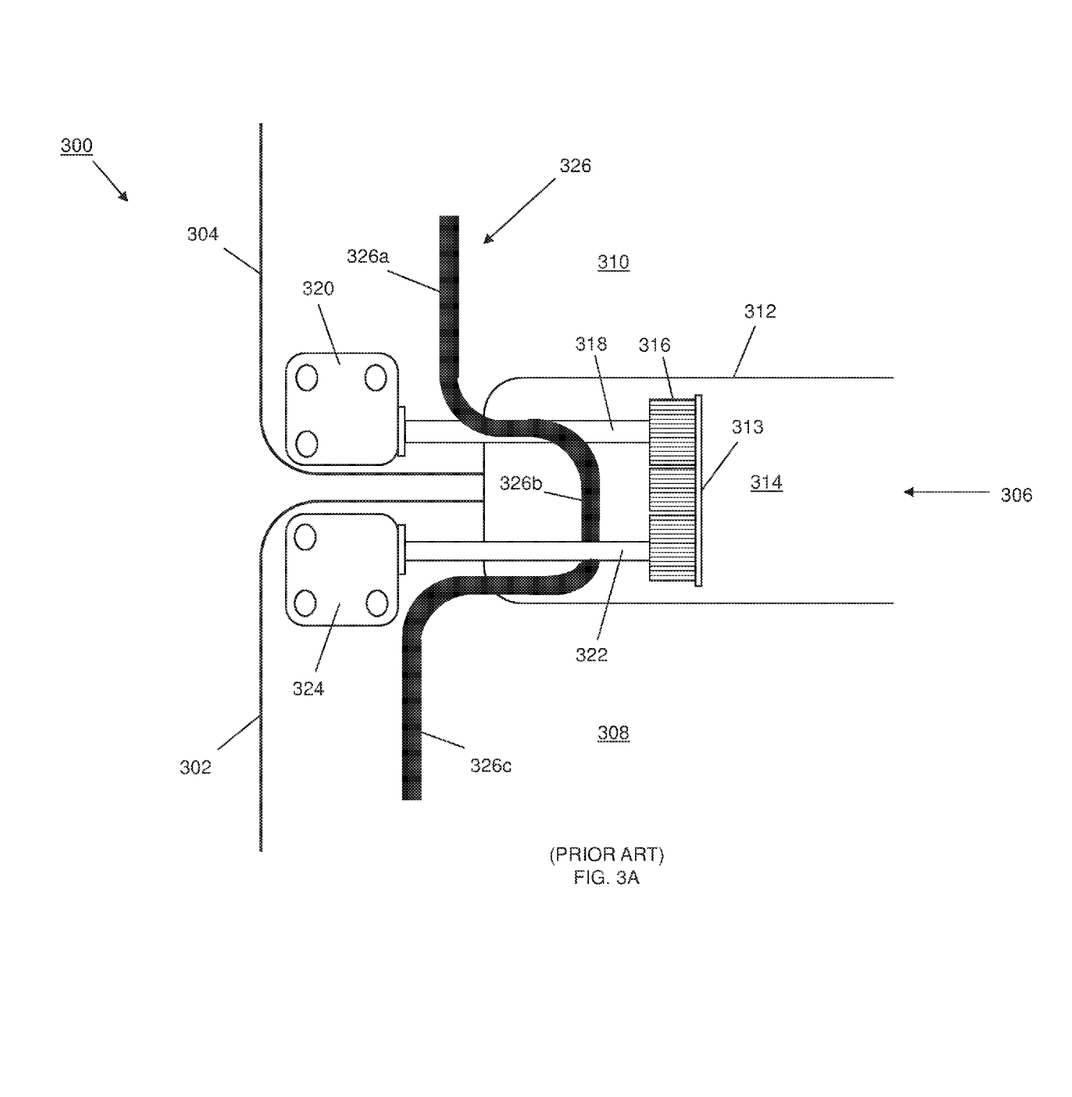
FIG. 3A is a cut-away, top schematic view illustrating an embodiment of prior art hinge cable routing in a convertible computing device.
Figure 3B:
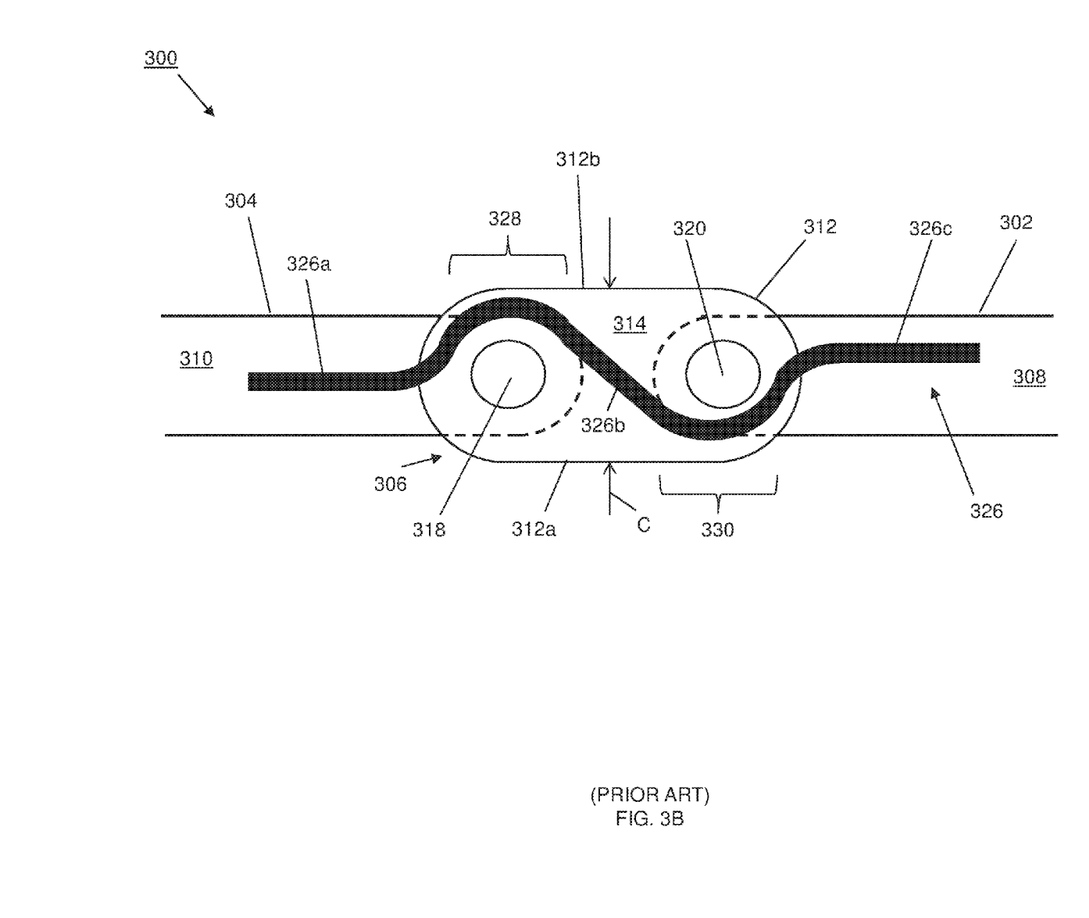
FIG. 3B is a partial cross-sectional schematic view illustrating an embodiment of the prior art hinge cable routing of FIG. 3A in a convertible computing device.

Referring now to FIGS. 3A and 3B, an embodiment of a prior art hinge cable routing system 300 is illustrated to allow a clear discussion of the differences between the systems and methods of the present disclosure and previous hinge cable routing techniques that are subject to the issues discussed above. The prior art hinge cable routing system 300 has previously been provided in convertible computing devices similar to the convertible computing device discussed above with reference to FIGS. 2A and 2B, and is discussed below using similar element numbers for components that are the same types of components as those discussed above with reference to FIGS. 2A (i.e., starting with a "3" instead of a "2"). As such, the prior art hinge cable routing system 300 includes a base chassis 302 that is moveably coupled to a display chassis 304 by a hinge 306. The base chassis 302 defines a base chassis housing 308 that may house any of the components (e.g., computing device components) discussed above, and the display chassis 304 defines a display chassis housing 310 that may house any of the display subsystems (e.g., a display device) discussed above. The hinge 306 includes a hinge chassis 312 that defines a hinge housing 314 that houses the hinge components of the hinge 306, only some of which are illustrated in FIGS. 3A and 3B.

In an embodiment, the hinge chassis 312 includes a plurality of chassis walls that define a hinge housing 314 between them. For example, FIG. 3B illustrates how the hinge chassis 312 includes a first wall 312a and a second wall 312b that are spaced apart from each other to define the hinge housing 314 between them. The hinge housing 314 houses a gear mechanism 316 that is moveably coupled to the hinge chassis 312 via, for example, a mounting feature 313 on the hinge chassis 312 that extends into the hinge housing 314. While not explicitly illustrated or described herein, one of skill in the art in possession of the present disclosure will recognize that the gear mechanism 316 may include a variety of gear components that allow for the convertible device functionality discussed above.

A first shaft 318 extends from a gear on the gear mechanism 316, through the hinge housing 314, out of the hinge chassis 312, into the display chassis housing 310 defined by the display chassis 304, and is mounted to a mounting member 320 that is located in the display chassis housing 310 and secured to the display chassis 304. A second shaft 322 extends from a gear on the gear mechanism 316, through the hinge housing 314, out of the hinge chassis 312, into the base chassis housing 308 defined by the base chassis 302, and is mounted to a mounting member 324 that is located in the base chassis housing 308 and secured to the base chassis 302. In the specific embodiment illustrated in FIG. 3B, the first wall 312a and the second wall 312b of the hinge chassis 312 provide substantially parallel hinge wall portions that are spaced apart by a distance C to provide a thickness of the hinge chassis 312, along with curved portions that meet along a centerplane of the hinge 306 that passes through the axis of rotation of each of the first shaft 318 and the second shaft 320.

A display cable 326 is coupled to display subsystems (e.g., the display device) in the display chassis 304, extends between the display chassis 304 and the hinge chassis 312, is routed through the hinge chassis 312, extends between the hinge chassis 312 and the base chassis 302, and is coupled to a computing device component (e.g., the processing system via a circuit board) in the base chassis 302. As such, the display cable 326 includes a first portion 326a that extends through the display chassis housing 310, a second portion 326b that extends through the hinge housing 314, and a third portion 326c that extends through the base chassis housing 308. FIG. 3B illustrates schematically how, in the prior art hinge cable routing system 300, the second portion 326b of the display cable 326 enters the hinge housing 314 from the display chassis housing 304, includes a first section 328 that is located between the second wall 312b of the hinge chassis 312 and the first shaft 318, includes a second section 330 that is located between the first wall 312a of the hinge chassis 312 and the second shaft 320, and then exits the hinge housing 314 to the base chassis housing 304. It has been found that cable routing techniques such as those utilized in the prior art hinge cable routing system 300 require a larger hinge chassis than is necessary (i.e., relative to when that hinge chassis is provided according to the teachings of the present disclosure), and increase the chance of damaging the second portion 326a of the display cable 326 due to repeated engagement of the display cable 326 with the first shaft 318 and second shaft 320 as the base chassis 302 and display chassis 304 are moved relative to each other via the first shaft 318 and the second shaft 320 to provide the closed, laptop/notebook, and table orientations discussed above.

Referring now to FIGS. 4A, 4B, 4C, and 4D, an embodiment of the convertible device hinge cable routing system 400 according to the teachings of the present disclosure is illustrated. The convertible device hinge cable routing system 400 is described below as being provided in the convertible computing device discussed above with reference to FIGS. 2A and 2B, and uses similar element numbers for components that are the same types of components as those discussed above with reference to prior art hinge cable routing system 300 of FIGS. 3A and 3B (i.e., starting with a "4" instead of a "3") in order to illustrate the differences between the two. As such, the convertible device hinge cable routing system 400 includes a base chassis 402 that is moveably coupled to a display chassis 404 by a hinge 406. The base chassis 402 defines a base chassis housing 408 that may house any of the components (e.g., computing device components) discussed above, and the display chassis 404 defines a display chassis housing 410 that may house any of the display subsystems (e.g., a display device) discussed above. The hinge 406 includes a hinge chassis 412 that defines a hinge housing 414 that houses the hinge components of the hinge 406, only some of which are illustrated in FIGS. 4A-4D.

Figure 4A:
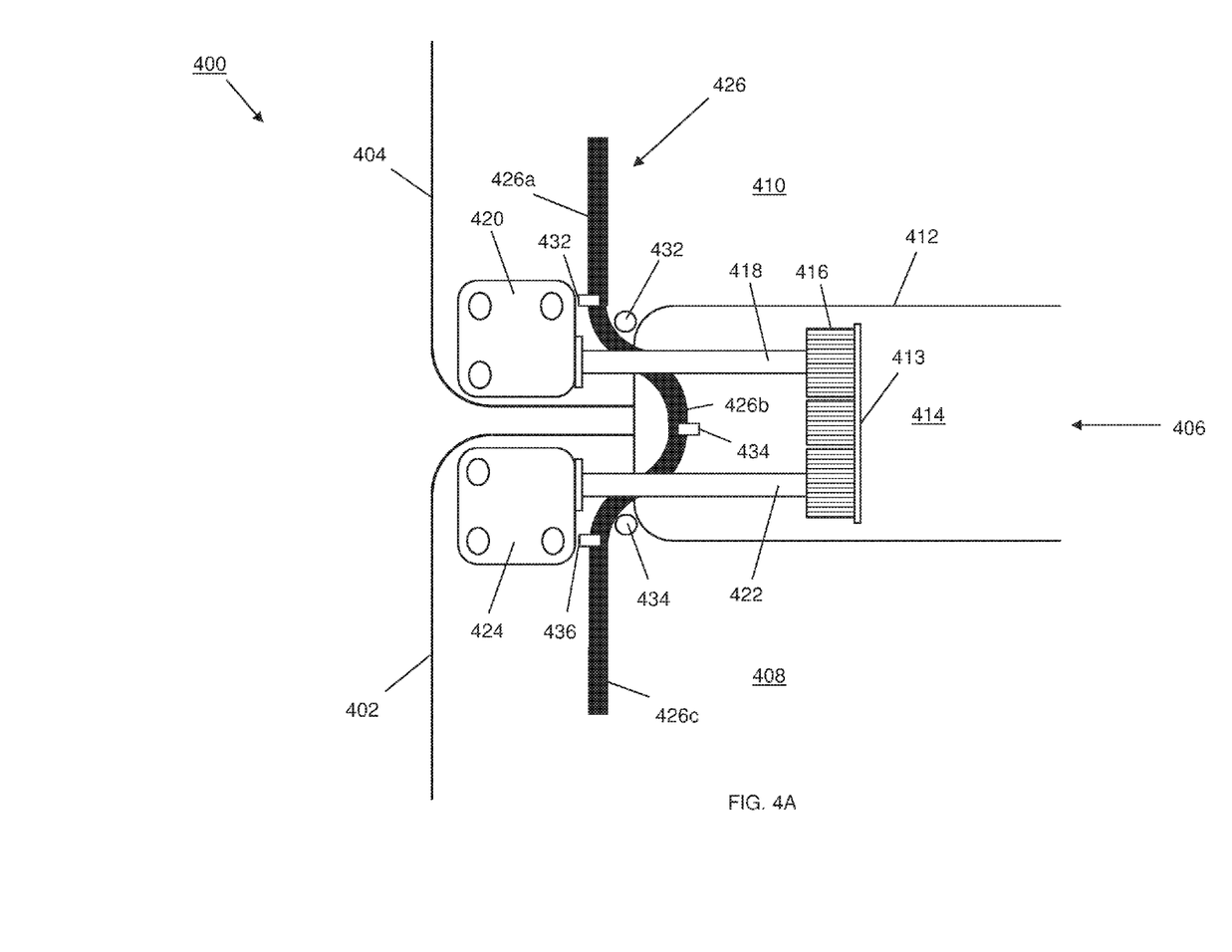
FIG. 4A is a cut-away, top schematic view illustrating an embodiment of hinge cable routing in the convertible computing device of FIG. 2 according to the teachings of the present disclosure.
Figure 4B:
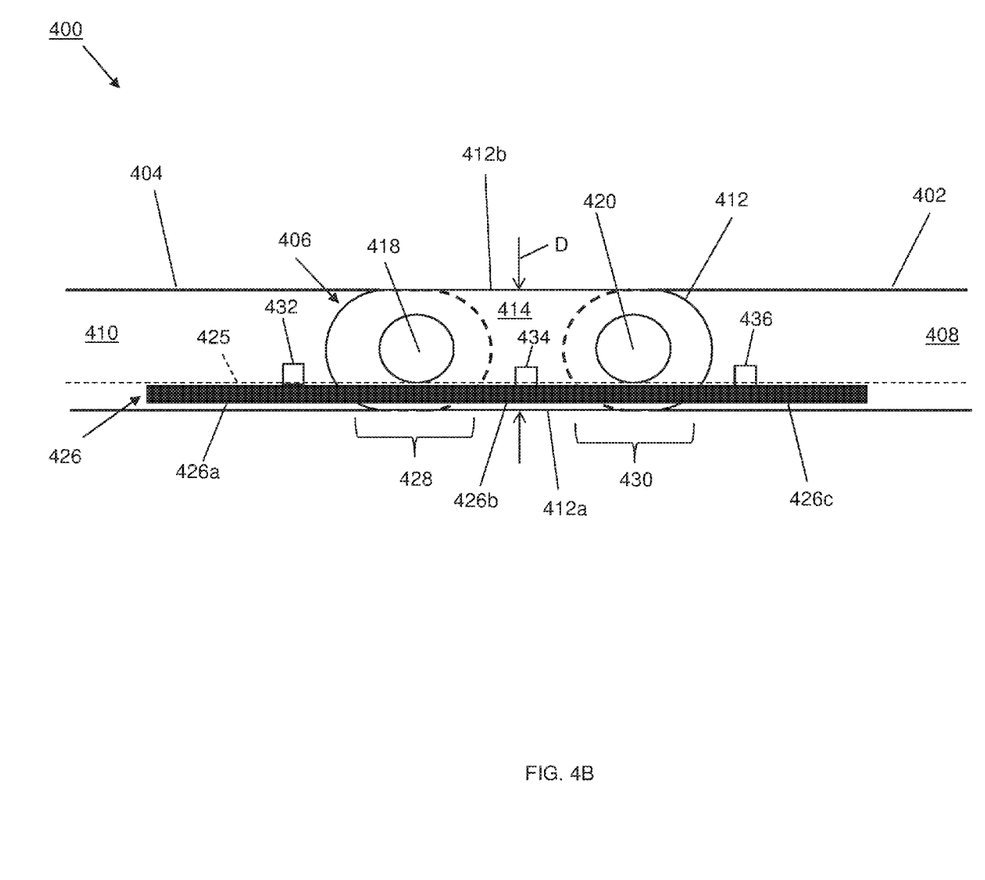
FIG. 4B is a partial cross-sectional schematic view illustrating an embodiment of the hinge cable routing of FIG. 3A in the convertible computing device of FIG. 2 according to the teachings of the present disclosure.
Figure 4C:
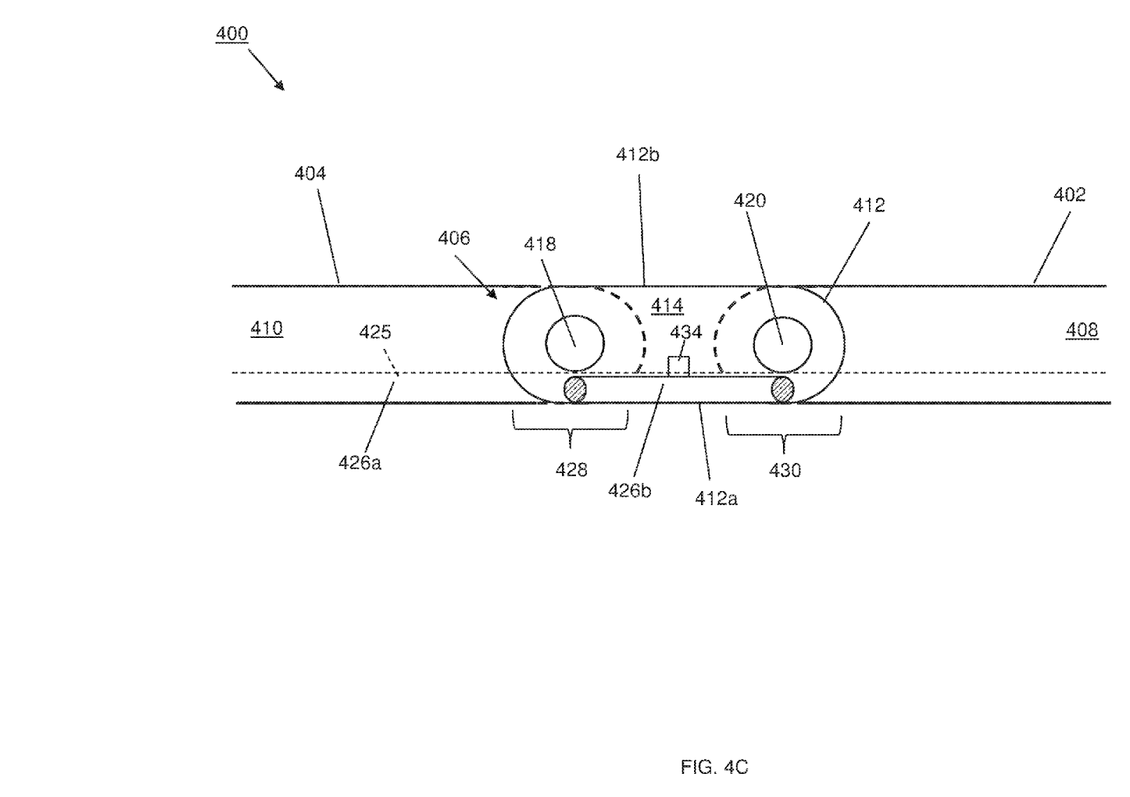
FIG. 4C is a partial cross-sectional view illustrating an embodiment of the hinge cable routing of FIG. 3A in the convertible computing device of FIG. 2 according to the teachings of the present disclosure.

In an embodiment, the hinge chassis 412 includes a plurality of chassis walls that define a hinge housing 414 between them. For example, FIG. 4B illustrates how the hinge chassis 412 includes a first wall 412a and a second wall 412b that are spaced apart from each other to define the hinge housing 414 between them. The hinge housing 414 houses a gear mechanism 416 that is moveably coupled to the hinge chassis 412 via, for example, a mounting feature 413 on the hinge chassis 412 that extends into the hinge housing 414. While not explicitly illustrated or described herein, one of skill in the art in possession of the present disclosure will recognize that the gear mechanism 416 may include a variety of gear components that allow for the convertible device functionality discussed above.

Figure 4D:
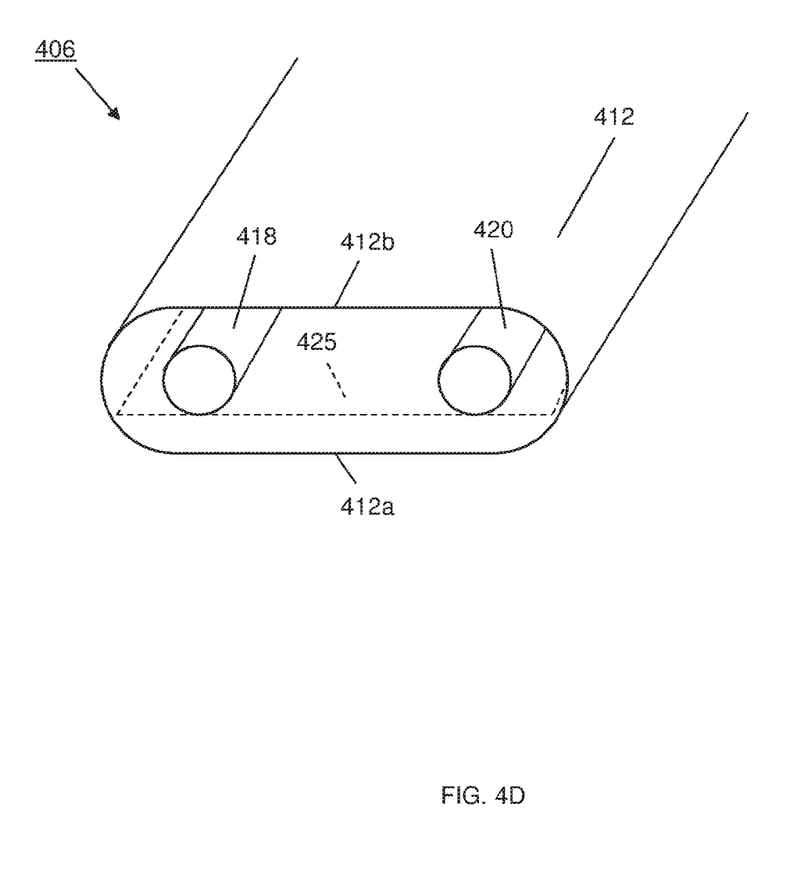
FIG. 4D is a perspective schematic view illustrating an embodiment of a hinge that may be provided in the convertible computing device of FIG. 2, including an illustration of an imaginary plane that tangentially engages shafts in the hinge in order to illustrate some benefits of the present disclosure.

A first shaft 418 extends from a gear on the gear mechanism 416, through the hinge housing 414, out of the hinge chassis 412, into the display chassis housing 410 defined by the display chassis 404, and is mounted to a mounting member 420 that is located in the display chassis housing 410 and secured to the display chassis 404. A second shaft 422 extends from a gear on the gear mechanism 416, through the hinge housing 414, out of the hinge chassis 412, into the base chassis housing 408 defined by the base chassis 402, and is mounted to a mounting member 424 that is located in the base chassis housing 408 and secured to the base chassis 402. While the hinge 406 is illustrated in FIG. 4B and described below as including the first wall 412a and the second wall 412b providing substantially parallel hinge wall portions along with curved portions (e.g., that meet along a centerplane of the hinge 406 that passes through the axis of rotation of each of the first shaft 418 and the second shaft 420) in order to discuss difference between the systems and methods of the present disclosure and prior art hinge cable routing system 300 that is subject to the issues discussed above, one of skill in the art in possession of the present disclosure will recognize that other hinge chassis structures will fall within the scope of the present disclosure as well. Furthermore, FIG. 4D is provided to illustrate an embodiment of an imaginary plane 425 that tangentially engages each of the first shaft 418 and the second shaft 420, which is used below to distinguish that embodiment of the teachings of the present disclosure from the prior art hinge cable routing system 300 of FIGS. 3A and 3B.

A display cable 426 is coupled to display subsystems (e.g., the display device) in the display chassis 404, extends between the display chassis 404 and the hinge chassis 412, is routed through the hinge chassis 412, extends between the hinge chassis 412 and the base chassis 402, and is coupled to a computing device component (e.g., the processing system via a circuit board) in the base chassis 402. As such, the display cable 426 includes a first portion 426a that extends through the display chassis housing 410, a second portion 426b of that extends through the hinge housing 414, and a third portion 426c that extends through the base chassis housing 408. FIG. 4B illustrates schematically how the convertible device hinge cable routing system 400 may include the second portion 426b of the display cable 426 entering the hinge housing 414 from the display chassis housing 404, including a first section 428 that is located between the first wall 412a of the hinge chassis 412 and the first shaft 418, including a second section 430 that is located between the first wall 412a of the hinge chassis 412 and the second shaft 420, and then exiting the hinge housing 414 to the base chassis housing 404.

As such, the embodiment of the convertible device hinge cable routing system 400 of FIGS. 4A-4D illustrates how the display cable 426 is routed through the hinge housing 414 adjacent the first wall 412a of the hinge chassis 412 and between the first wall 412a and each of the first shaft 418 and the second shaft 420 such that no section of the portion 426b of the cable 426a that extends through the hinge housing 414 is located between the second wall 412b and either of the first shaft 418 and the second shaft 420. In the illustrated embodiment, cabling securing elements 432 extend from the display chassis 404 and into engagement with the portion 426a of the display cable 426 to resist movement of the display cable 426 relative to the display chassis 404, a cabling securing element 434 extends from the hinge chassis 412 and into engagement with the portion 426b of the display cable 426 to resist movement of the display cable 426 relative to the hinge chassis 412, and cabling securing elements 436 extend from the base chassis 402 and into engagement with the portion 426c of the display cable 426 to resist movement of the display cable 426 relative to the base chassis 402. However, one of skill in the art will recognize and additional and or different types of cable securing elements or than those illustrated may be provided in the convertible device hinge cable routing system 400 to resist movement of the display cable 426 immediately prior to its routing through the hinge 406, as part of its routing through the hinge 406, and/or immediately subsequent to its routing through the hinge 406.

It has been found that the cable routing techniques utilized in the convertible device hinge cable routing system 400 allow for a relatively smaller hinge chassis than those provided by the prior art hinge cable routing system 300. For example, in experimental embodiments, the distance C that provides the thickness of the hinge chassis 312 in the prior art hinge cable routing system 300 is approximately 17 millimeters in order to house or otherwise accommodates the portion of the display cable 326b that extends between both the second wall 312b and the first shaft 318, and the first wall 312a and the second shaft 320. To contrast, in experimental embodiments, the distance D that provides the thickness of the hinge chassis 412 in the convertible device hinge cable routing system 400 is approximately 11.3 millimeters, a hinge chassis thickness reduction that results from the need to house or otherwise accommodates the portion 426b of the display cable 426 that extends between only the first wall 412a and each of the first shaft 418 and the second shaft 420 (i.e., rather than having to accommodate the portion 426b of the display cable 426 on opposite sides of the first shaft 418 and the second shaft 420). Furthermore, experimental embodiments of the convertible device hinge cable routing system 400 have confirmed that display cable/shaft engagement is substantially reduced and/or completely eliminated during the relative movement of the base chassis 302 and display chassis 304 via the first shaft 318 and the second shaft 320 to provide the closed, laptop/notebook, and table orientations discussed (i.e., because the portion 426b of the display cable 426 is secured adjacent the first wall 412a to prevent or reduce its engagement with the first shaft 418 and the second shaft 420.)

Figure 5:
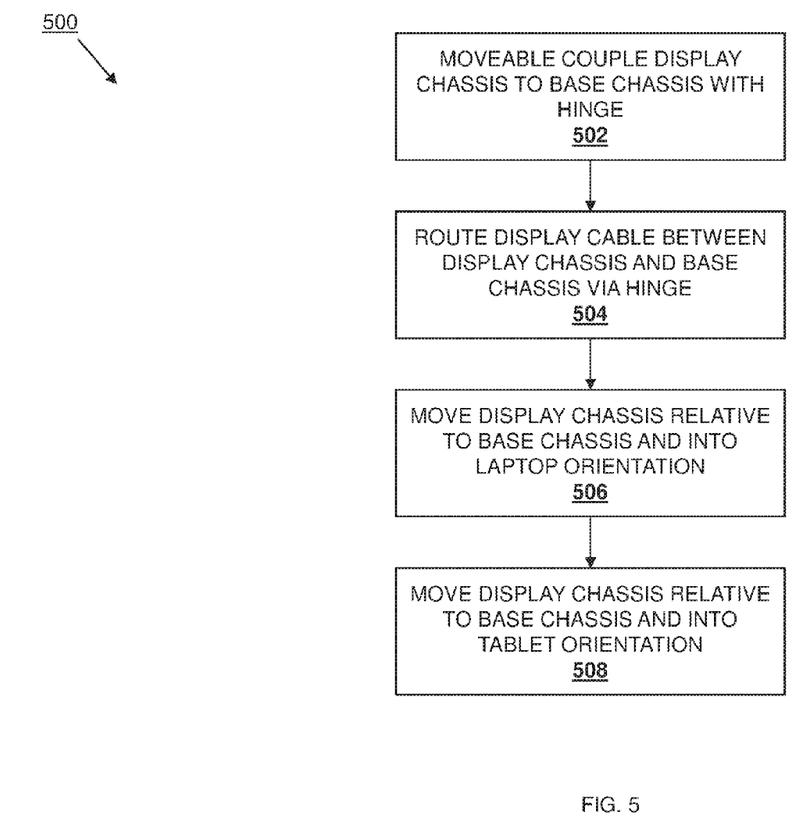
FIG. 5 is a flow chart illustrating a method for providing a convertible computing device.

Referring now to FIG. 5, an embodiment of a method 500 for providing a convertible laptop/tablet computing device is illustrated. The method 500 begins at block 502 where a display chassis is moveably coupled to a base chassis with a hinge. In an embodiment, the convertible computing device described above with reference to FIGS. 2A, 2B, and 4A-4D may be provided that includes the base chassis 202/402 coupled to the display chassis 204/404 with the hinge 206/406 in the manner described above. The method 500 then proceeds to block 504 where a display cable is routed between the display chassis and the base chassis via the hinge. In an embodiment, the display cable 426 maybe routed between the base chassis 402 and the display chassis 404 via the hinge 406 in the manner discussed above such that the display cable 426 extends through the hinge housing 414 adjacent the first wall 412 of the hinge chassis 412 and between the first wall 412 and each of the first shaft 418 and the second shaft 420 such that no section of the portion 426b of the display cable 426 that extends through the hinge housing 414 is located between the second wall 412b of the hinge chassis 412 and either of the first shaft 418 and the second shaft 420. The method 500 then proceeds to block 506 where the display chassis may be moved relative to the base chassis and into a laptop orientation. In an embodiment, the display chassis 204/404 maybe moved relative to the base chassis 202/402 via the hinge 206/406 and into the laptop orientation A in the same manner as discussed above with reference to FIG. 2A. The method 500 then proceeds to block 508 where the display chassis may be moved relative to the base chassis and into a tablet orientation. In an embodiment, the display chassis 204/404 maybe moved relative to the base chassis 202/402 via the hinge 206/406 and into the tablet orientation B in the same manner as discussed above with reference to FIG. 2B.

Thus, systems and methods have been described that provide for the routing of a display cable through a monohinge provided for a convertible laptop/tablet computing device in a manner that allows for a reduction of the dimensions of the monohinge while also reducing the risk of damage to the display cable when the convertible laptop/tablet computing device is actuated to switch between closed, laptop, and tablet orientations. Such benefits are provided by routing the portion of the display cable that extends through the hinge housing such that that portion of the display cable is located immediately adjacent a wall of the hinge chassis for the entire routing length of that portion of the display cable, and between that wall and each of a first shaft and a second shaft that extend through the hinge housing. Experimental embodiments of the display cable routing techniques described herein have been found to reduce the thickness of the monohinge relative to prior art monohinge cable routing systems that wrap the display cable at least partially around each of the first and second shaft and thus require cable routing volumes between each shaft and each of the opposing walls of the monohinge, while also reducing and/or eliminating display cable damage that results in prior art monohinge cable routing systems when the display cable repeatedly engages the first and second shafts during actuation between closed, laptop, and tablet orientations.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A hinge cable routing system, comprising:
a hinge chassis defining a hinge housing;
a first shaft that extends through the hinge housing;
a second shaft that extends through the hinge housing; and
a cable that is routed through the hinge housing such that the cable extends past a first axis of rotation of the first shaft and a second axis of rotation of the second shaft in a hinge chassis housing volume that is defined between the hinge chassis and an imaginary plane that intersects each of the first axis of rotation and the second axis of rotation.

2. The system of claim 1, further comprising:
a first chassis portion that is coupled to the first shaft to allow the first chassis portion to rotate relative to the hinge chassis; and
a first component that is housed in the first chassis portion and that is coupled to the cable.

3. The system of claim 2, further comprising:
a second chassis portion that is coupled to the second shaft to allow the second chassis portion to rotate relative to the hinge chassis; and
a second component that is housed in the second chassis portion and that is coupled to the cable.

4. The system of claim 2, further comprising:
at least one cable securing element extending from the first chassis portion and into engagement with the cable to resist movement of the cable relative to the first chassis portion.

5. The system of claim 3, further comprising:
at least one cable securing element extending from the second chassis portion and into engagement with the cable to resist movement of the cable relative to the second chassis portion.

6. The system of claim 1, further comprising:
at least one cable securing element extending from the hinge chassis and into engagement with the cable to resist movement of the cable relative to the hinge chassis.

7. The system of claim 1, wherein the cable extends through the hinge housing such that the cable does not cross a portion of the imaginary plane that intersects each of the first axis of rotation and the second axis of rotation and that is located between the first axis of rotation and the second axis of rotation.

8. An Information Handling System (IHS), comprising:
a display chassis that houses a display device;
a base chassis that houses a processing system;
a display cable coupled to each of the display device and the processing system; and
a hinge that moveable couples the display chassis to the base chassis, wherein the hinge includes:
a hinge chassis defining a hinge housing;
a first shaft that extends through the hinge housing and into engagement with the display chassis, wherein the first shaft is configured to provide relative movement between the display chassis and the hinge; and
a second shaft that extends through the hinge housing and into engagement with the base chassis, wherein the second shaft is configured to provide relative movement between the base chassis and the hinge;
wherein the display cable is routed through the hinge housing such that the display cable extends past a first axis of rotation of the first shaft and a second axis of rotation of the second shaft in a hinge chassis housing volume that is defined between the hinge chassis and an imaginary plane that intersects each of the first axis of rotation and the second axis of rotation.

9. The IHS of claim 8, further comprising:
at least one cable securing element extending from display chassis and into engagement with the display cable to resist movement of the display cable relative to the display chassis.

10. The IHS of claim 8, further comprising:
at least one cable securing element extending from the base chassis and into engagement with the display cable to resist movement of the display cable relative to the base chassis.

11. The IHS of claim 8, further comprising:
at least one cable securing element extending from the hinge chassis and into engagement with the display cable to resist movement of the display cable relative to the hinge chassis.

12. The IHS of claim 8, wherein the hinge provides the only hinge that is coupled between the display chassis and the base chassis and configured to provide relative movement between the display chassis and the base chassis.

13. The IHS of claim 8, wherein the display cable extends through the hinge housing such that the display cable does not cross a portion of the imaginary plane that intersects each of the first axis of rotation and the second axis of rotation and that is located between the first axis of rotation and the second axis of rotation.

14. The IHS of claim 8, wherein the hinge moveably couples the display chassis to the base chassis to allow for a laptop/notebook orientation and a tablet orientation.

15. A method for providing a convertible laptop/tablet computing device, comprising:
  moveably coupling a first chassis portion to a second chassis portion using a hinge, wherein the hinge includes:
    a hinge chassis defining a hinge housing;
    a first shaft that extends through the hinge housing; and
    a second shaft that extends through the hinge housing;
  routing a cable between the first chassis portion and the second chassis portion through the hinge housing such that the cable extends past a first axis of rotation of the first shaft and a second axis of rotation of the second shaft in a hinge chassis housing volume that is defined between the hinge chassis and an imaginary plane that intersects each of the first axis of rotation and the second axis of rotation;
  moving the first chassis portion relative to the second chassis portion into a first orientation; and
  moving the first chassis portion relative to the second chassis portion into a second orientation.

16. The method of claim 15, further comprising:
  securing the cable to the first chassis portion to resist movement of the cable relative to the first chassis portion.

17. The method of claim 15, further comprising:
  securing the cable to the second chassis portion to resist movement of the cable relative to the second chassis portion.

18. The method of claim 15, further comprising:
  securing the cable to the hinge chassis to resist movement of the cable relative to the hinge chassis.

19. The method of claim 15, wherein the hinge provides the only hinge that is coupled between the first chassis portion and the second chassis portion and configured to provide relative movement between the first chassis portion and the second chassis portion.

20. The method of claim 15, wherein the cable extends through the hinge housing such that the cable does not cross a portion of the imaginary plane that intersects each of the first axis of rotation and the second axis of rotation and that is located between the first axis of rotation and the second axis of rotation.

* * * * *